US010943703B2

United States Patent
Wada et al.

(10) Patent No.: US 10,943,703 B2
(45) Date of Patent: Mar. 9, 2021

(54) FUEL ASSEMBLY, CORE DESIGN METHOD AND FUEL ASSEMBLY DESIGN METHOD OF LIGHT-WATER REACTOR

(71) Applicants: Kabushiki Kaisha Toshiba, Minato-ku (JP); Toshiba Energy Systems & Solutions Corporation, Kawasaki (JP)

(72) Inventors: Satoshi Wada, Kawasaki (JP); Hiroshi Matsumiya, Yokohama (JP); Tsukasa Sugita, Yokohama (JP); Rei Kimura, Setagaya (JP); Rie Aizawa, Yokohama (JP); Noriyuki Yoshida, Yokohama (JP)

(73) Assignees: Kabushiki Kaisha Toshiba, Minato-ku (JP); Toshiba Energy Systems & Solutions Corporation, Kawasaki (JP)

(*) Notice: Subject to any disclaimer, the term of this patent is extended or adjusted under 35 U.S.C. 154(b) by 199 days.

(21) Appl. No.: 15/888,622

(22) Filed: Feb. 5, 2018

(65) Prior Publication Data
US 2018/0226160 A1    Aug. 9, 2018

(30) Foreign Application Priority Data

Feb. 9, 2017    (JP) ................................. 2017-022319
Nov. 10, 2017    (JP) ................................. 2017-217136

(51) Int. Cl.
*G21D 3/00*    (2006.01)
*G21C 7/04*    (2006.01)
(Continued)

(52) U.S. Cl.
CPC ................. *G21C 7/04* (2013.01); *G21C 3/07* (2013.01); *G21C 3/30* (2013.01); *G21C 3/32* (2013.01);
(Continued)

(58) Field of Classification Search
CPC ........... G21D 3/001; G21D 3/002; G21C 7/04
See application file for complete search history.

(56) References Cited

U.S. PATENT DOCUMENTS

| 4,587,090 A | * | 5/1986 | Mochida | G21C 3/18 376/419 |
| 5,089,210 A | * | 2/1992 | Reese | G21C 3/326 376/212 |

(Continued)

FOREIGN PATENT DOCUMENTS

| JP | 62-106391 | 5/1987 |
| JP | H09-080180 A | 3/1997 |

(Continued)

*Primary Examiner* — Lily C Garner
(74) *Attorney, Agent, or Firm* — ObLon, McClelland, Maier & Neustadt, L.L.P.

(57) ABSTRACT

According to an embodiment, a design method for a light-water reactor fuel assembly comprises: accumulating a determined fuel data, showing that each of a combination of p·n/N and e is feasible as the core or not, wherein N is a number of the fuel rods in the fuel assembly, n is a number of the fuel rods containing the burnable poison, p is a ratio wt % of the burnable poison in the fuel, and e is an enrichment wt % of the uranium 235 contained in the fuel assembly; formulating a criterion formula which determines whether a combination of p·n/N and e is feasible as a core or not and is formulated based on the determined fuel data; and determining whether a temporarily set composition of the fuel assembly is approved as a core or not based on the criterion formula.

10 Claims, 10 Drawing Sheets

(51) Int. Cl.
*G21C 3/07* (2006.01)
*G21C 3/58* (2006.01)
*G21C 3/30* (2006.01)
*G21C 21/00* (2006.01)
*G21C 3/32* (2006.01)

(52) U.S. Cl.
CPC .............. *G21C 3/58* (2013.01); *G21C 21/00* (2013.01); *G21D 3/001* (2013.01); *G21D 3/002* (2019.01); *Y02E 30/30* (2013.01)

(56) References Cited

U.S. PATENT DOCUMENTS

| | | | |
|---|---|---|---|
| 5,359,634 A * | 10/1994 | Johannesson | G21C 3/328 376/428 |
| 2014/0064433 A1 | 3/2014 | Nakadozono et al. | |
| 2016/0217874 A1* | 7/2016 | Dewan | G21C 3/54 |

FOREIGN PATENT DOCUMENTS

| | | |
|---|---|---|
| JP | 2000-284081 A | 10/2000 |
| JP | 2008-145286 | 6/2008 |
| JP | 2010-122063 A | 6/2010 |
| JP | 2014-048159 A | 3/2014 |

* cited by examiner

FUEL ASSEMBLY, CORE DESIGN METHOD AND FUEL ASSEMBLY DESIGN METHOD OF LIGHT-WATER REACTOR

CROSS-REFERENCE TO RELATED APPLICATIONS

This application is based upon and claims the benefit of priority from Japanese Patent Application Nos. 2017-22319 filed on Feb. 9, 2017 and 2017-217136 filed on Nov. 10, 2017; the entire contents of all of which are incorporated herein by reference.

FIELD

The embodiments of the present invention relate to a fuel assembly, a core design method and a fuel assembly design method of a light-water reactor.

BACKGROUND

Generally, a nuclear reactor is operated such that fuel excess reactivity becomes zero at the EOC (End of Cycle) in a light-water reactor fuel assembly and a light-water reactor core.

In a boiling water reactor (BWR), concentration control is performed such that the neutron absorption capacity of a burnable poison such as gadolinium oxide (gadolinia) is fully burned out at the EOC. There are cases where thermal characteristics of the core are improved for an initial loading core, which is a first cycle core of the BWR plant, by intentionally making the burnable poison of a minor proportion of the fuel unburned, while compensating lack of excess reactivity with the remaining fuel.

In a pressurized water reactor (PWR), concentration control is performed such that a boric acid concentration in chemical shim is zero at the EOC. Fissile material enrichment is controlled according to a target discharging burnup (same meaning as "achievement burnup") etc., and thus excessively high enrichment is not used.

Further, when spent nuclear fuel is recycled, the above-mentioned light-water reactor fuel and the fuel used in the light-water reactor core are discharged from the core and then reprocessed. Then, uranium and plutonium isotopes are extracted for reuse, and minor actinides are disposed of as high-level radioactive waste. The minor actinides have high toxicity, so that particularly harmful minor actinides are separated by a reprocessing method called partitioning. The separated minor actinides are added to MOX (Mixed Oxide) fuel and burned in a fast reactor or subjected to irradiation in an accelerator with the minor actinides as a target to be transmutation into a nuclide with low toxicity. As described above, so-called "partitioning and transmutation" is considered to be performed.

BRIEF DESCRIPTION OF THE DRAWINGS

FIG. 2 is a detail schematic view of part II of FIG. 1.

FIG. 3 is a detail schematic view of part II of FIG. 1.

DETAILED DESCRIPTION

When once-through cycle is adopted (that is, nuclear fuel recycling is not performed), spent fuel is subjected to final disposal as it is. In the once-through cycle, a process like the above-mentioned "partitioning and transmutation" is not performed, so that the toxicity of the minor actinides is not reduced.

On the other hand, an intentional use of high-enrichment uranium fuel allows reduction of the production of the minor actinides. This is because using uranium fuel having a high uranium 235 enrichment increases the rate of nuclear fission reaction by uranium 235 to reduce the rate of absorption reaction caused by uranium 238 to thereby reduce reduction of the production of the minor actinides. However, an increase in the uranium 235 enrichment increases excess reactivity, with the result that the excess reactivity may exceed a reactivity worth given by a reactivity control devices such as control rods, which may make it hard to control the reactivity.

The increase in the excess reactivity to be brought about by the increase in the uranium enrichment can be suppressed by using a burnable poison. The burnable poison can also be used effectively for a fuel assembly whose uranium enrichment is increased for reduction of the toxicity of the minor actinides. However, a large number of complicated calculations need to be performed for determination of the concentration or the number of the burnable poison-containing fuel rods, and thus effective design has heretofore not been made.

The embodiments of the present invention have been made to solve the above problems, and the object thereof is to reduce the excess reactivity when the uranium enrichment is increased in a light-water reactor.

According to an embodiment, there is presented a design method for a fuel assembly of a light-water reactor, which includes a plurality of fuel rods arranged in parallel separated by a distance in a direction perpendicular to the longitudinal axis of the fuel rods, the fuel rod including a fuel clad and a fuel in the fuel clad, the fuel containing material based on uranium dioxide containing enriched uranium 235, some of the fuel rods including a burnable poison in the fuel, the method comprising: accumulating a determined fuel data investigated by analyses or experiments, showing that each of a combination of p·n/N and e is feasible as the core or is not approved as the core, wherein N is an integer equal to or greater than 2 and a number of the fuel rods in the fuel assembly, n is a number of the fuel rods containing the burnable poison and an integer equal to or greater than 1 and less than N, p is a ratio wt % of the burnable poison in the fuel, and e is an enrichment wt % of the uranium 235 contained in all of the fuel rods in the fuel assembly; formulating a criterion formula which determines whether a combination of p·n/N and e is feasible as a core or is not feasible as a core and is formulated based on the determined fuel data; and determining whether a temporarily set composition of the fuel assembly is approved as a core or is not approved as a core based on the criterion formula.

According to an embodiment, there is presented a design method for a core of a light-water reactor, which includes a plurality of fuel assemblies arranged in parallel and arranged into a square lattice array separated by a distance in a direction perpendicular to the longitudinal axis of the fuel assemblies, a reactivity control device in the distance between the fuel assemblies, a plurality of fuel rods arranged in parallel separated by a distance in a direction perpendicular to the longitudinal axis of the fuel rods in the fuel assembly, the fuel rods including a fuel clad and a fuel in the fuel clad, the fuel containing material based on uranium dioxide containing enriched uranium 235, some of the fuel rods including a burnable poison in the fuel, the method comprising: accumulating a determined fuel data investigated by analyses or experiments, showing that each of a combination of p·n/N and e is approved as the core or is not approved as the core, wherein N is an integer equal to or greater than 2 and a number of the fuel rods in the fuel assembly, n is a number of the fuel rods containing the burnable poison and an integer equal to or greater than 1 and less than N, p is a ratio wt % of the burnable poison in the fuel, and e is an enrichment wt % of the uranium 235 contained in all of the fuel rods in the fuel assembly; formulating a criterion formula which determines a combination of p·n/N and e is approved as a core or is not approved as a core and is formulated based on the determined fuel data; and determining whether a temporarily set composition of the fuel assembly is approved as a core or is not approved as a core based on the criterion formula.

According to an embodiment, there is presented a fuel assembly of a light-water reactor comprising: a plurality of fuel assemblies arranged in parallel and arranged into a square lattice array separated by a distance in a direction perpendicular to the longitudinal axis of the fuel assemblies; a plurality of fuel rods arranged in parallel separated by a distance in a direction perpendicular to the longitudinal axis of the fuel rods in the fuel assembly; a fuel clad included in the fuel rods; a fuel included in the fuel rods and covered by the fuel clad and containing material based on uranium dioxide containing enriched uranium 235, wherein some of the fuel rods contain a burnable poison in the fuel, and p, n, N and e satisfy a formula: $0.57\ e^{-1.8} < p \cdot n/N < 0.57\ e^{-0.8}$, wherein N is an integer equal to or greater than 2 and a number of the fuel rods in the fuel assembly, n is a number of the fuel rods containing the burnable poison and an integer equal to or greater than 1 and less than N, p is a ratio wt % of the burnable poison in the fuel, and e is an enrichment wt % of the uranium 235 contained in all of the fuel rods in the fuel assembly.

Hereinafter, fuel assemblies, core design methods, and fuel assembly design methods of a light-water reactor according to embodiments of the present invention will be described with reference to the accompanying drawings. While the following description will be given mainly targeting a boiling water reactor, the present invention is applicable also to a pressurized water reactor.

Figure 1:
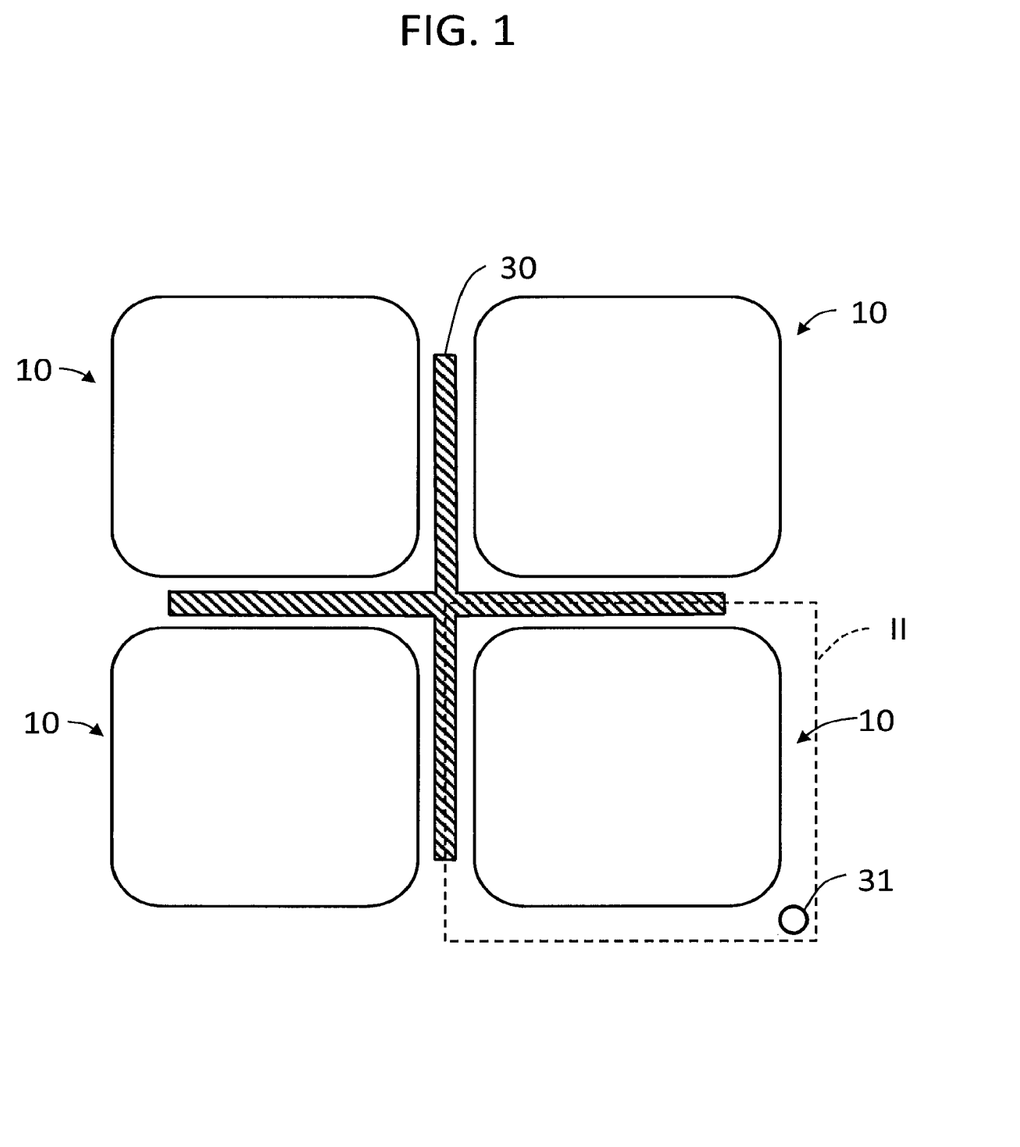
FIG. 1 is a plan cross-sectional view illustrating one control rod, four fuel assemblies surrounding the control rod, and the surrounding thereof in a BWR core according to an embodiment of the present invention.
Figure 2:
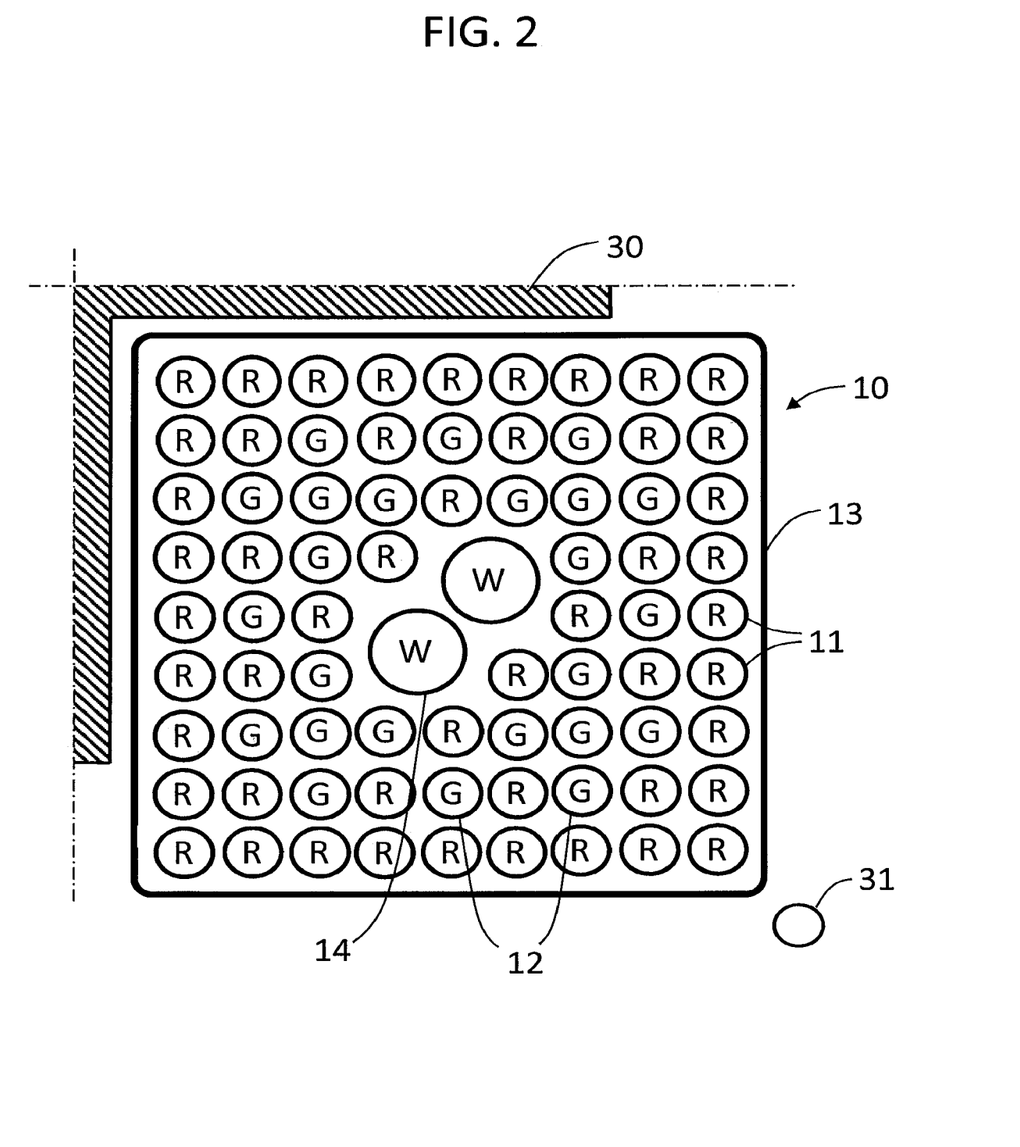
FIG. 2 is a view illustrating in detail an example of the internal configuration of the fuel assembly in the BWR core according to the embodiment of the present invention, and more specifically.
Figure 3:
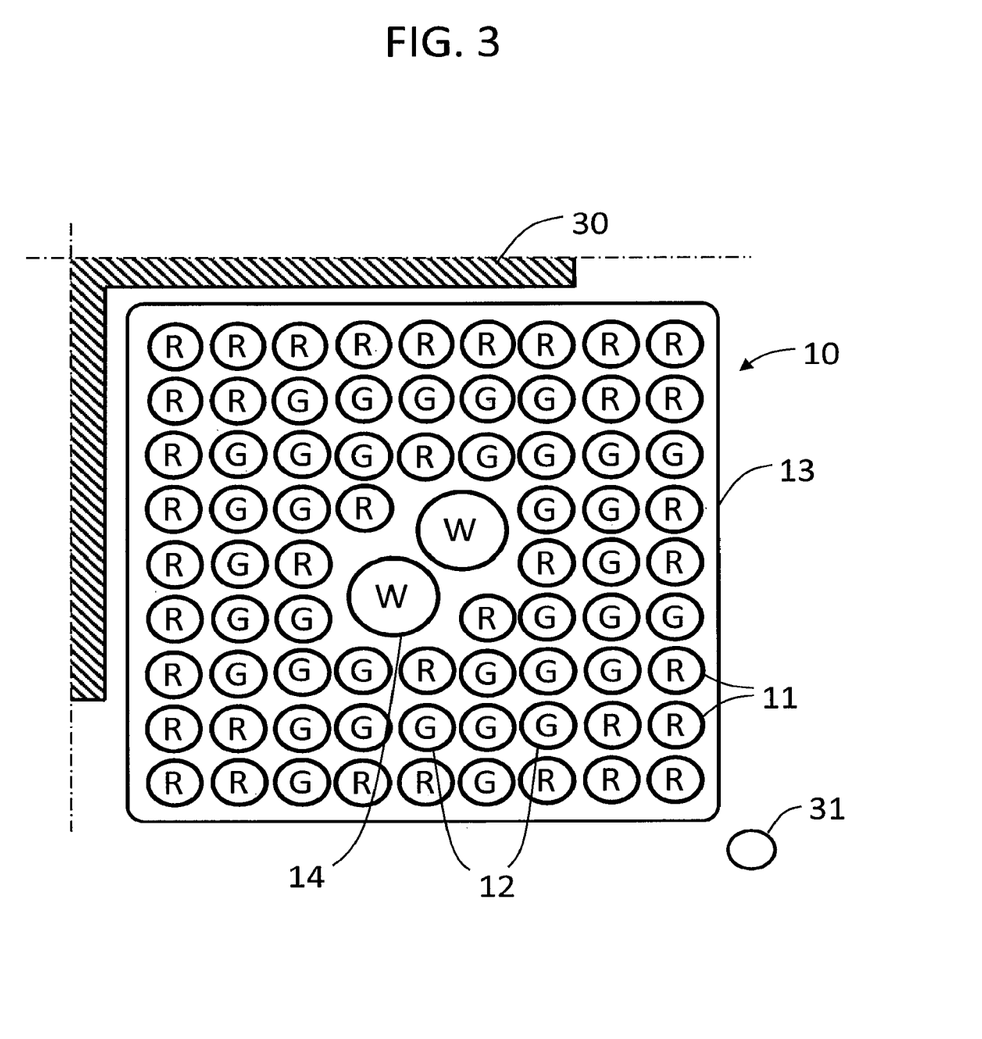
FIG. 3 is a view illustrating in detail another example (different from the example of FIG. 2) of the internal configuration of the fuel assembly in the BWR core according to the embodiment of the present invention, and more specifically.
Figure 4:
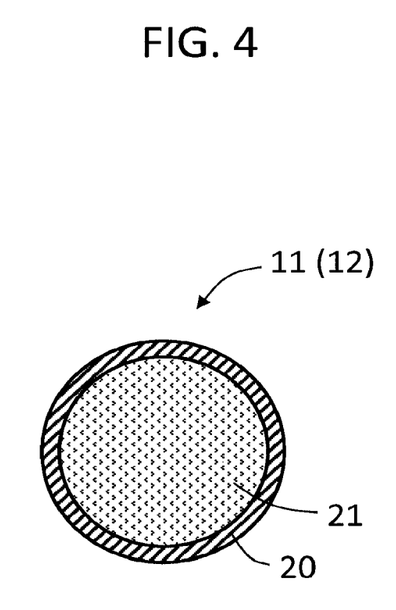
FIG. 4 is a plan cross-sectional view illustrating the structure of a fuel rod constituting a BWR fuel assembly according to the embodiment of the present invention.

FIG. 1 is a plan cross-sectional view illustrating one control rod, four fuel assemblies surrounding the control rod, and the surrounding thereof in a BWR core according to an embodiment of the present invention. In FIG. 1, a detailed structure of each fuel assembly is omitted. FIG. 2 is a view illustrating in detail an example of the internal configuration of the fuel assembly in the BWR core according to the embodiment of the present invention. More specifically, FIG. 2 is a detail schematic view of part II of FIG. 1. FIG. 3 is a view illustrating in detail another example (different from the example of FIG. 2) of the internal configuration of the fuel assembly in the BWR core according to the embodiment of the present invention. More specifically, FIG. 3 is a detail schematic view of part II of FIG. 1. FIG. 4 is a plan cross-sectional view illustrating the structure of a fuel rod constituting a BWR fuel assembly according to the embodiment of the present invention.

In the BWR core of the embodiment, several hundreds of fuel assemblies 10 are arranged in a square grid in a horizontal plane. The enrichment of uranium is, e.g., 3.8% on average in normal uranium fuel assemblies. In Japan, for example, facilities for conventional normal uranium fuel assemblies are designed assuming that the uranium enrichment is less than 5.0%. On the other hand, in the light-water reactor fuel assemblies 10 of the present embodiment, the uranium enrichment is 5.0% which is higher than that in the normal uranium fuel assemblies. In the following description, the uranium enrichment is assumed to be 5.0%, but this is not limitative. As described later, the uranium enrichment may be higher or lower than 5.0% as long as effects can be obtained.

In each fuel assembly 10, a plurality of fuel rods 11 and 12 vertically extending in parallel to each other are arranged in a square grid (9 by 9 in the examples of FIGS. 2 and 3) in a horizontal plane. The outer periphery of the fuel assembly 10 is surrounded by a substantially square-cylindrical channel box 13 which extends in the vertical direction. Two water rods 14 (marked by "W" in FIGS. 2 and 3) are disposed at the center of the fuel assembly 10. The water rods 14 each have a hollow cylindrical shape extending in the vertical direction inside of which water flows. Although the water rods 14 are two circular tubes in the examples of FIGS. 2 and 3, the number of the water rods 14 may be one or three or more, and the shape thereof may be a square-cylindrical tube.

Each of the fuel rods 11 and 12 includes a circular cladding tube 20 extending vertically and nuclear fuel material 21 enclosed in the cladding tube 20. The nuclear fuel material 21 contains uranium oxide containing enriched uranium. The nuclear fuel material 21 is normally formed into a plurality of columnar pellets, and the pellets are axially stacked in the cladding tube 20. The fuel rods 12 are a fuel rods containing burnable poison (marked by "G" in FIGS. 2 and 3), and the nuclear fuel material 21 in the fuel rod 12 contains a burnable poison (e.g., gadolinia). The fuel rods 11 are fuel rods not containing burnable poison (marked by "R" in FIGS. 2 and 3), and the nuclear fuel material 21 in the fuel rods 11 do not contain burnable poison.

Control using a control cell core is considered as reactivity control for the BWR. This is core design in which the number of unit cells into each of which a control rod is inserted at normal operation time is made small. Each of the control rods used for power control at normal operation time is surrounded by four fuel assemblies to obtain one control cell. Specifically, in the control cell, a control rod (reactivity control device) 30 having a cross shape in the horizontal cross section and extending vertically is disposed at the center of mutually adjacent 2 by 2 arrayed fuel assemblies 10. At normal operation of the nuclear reactor, light water is filled outside the channel boxes 13. The control rods 30 are inserted and withdrawn in the vertical direction in/from the water outside the channel boxes 13 so as to be able to control nuclear reactor power.

A local power range monitor (LPRM) 31 as a nuclear instrumentation device is disposed outside the channel boxes 13 at a diagonal position with respect to the center of the control rod 30.

In general, the thermal conductivity of burnable poison such as gadolinia is lower than that of uranium oxide. Thus, the enrichment of uranium 235 in the nuclear fuel material 21 enclosed in the burnable poison-containing fuel rod 12 is made lower than the maximum value of the enrichment of uranium 235 in the nuclear fuel material 21 included in the fuel assembly 10. With this configuration, it is possible to avoid the thermal power of the burnable poison-containing fuel rods 12 from being greater than thermal power of the other fuel rods to thereby prevent the burnable poison-containing fuel rods 12 from being excessively heated.

As illustrated in FIGS. 2 and 3, in the fuel assembly 10, the burnable poison-containing fuel rods 12 may not be disposed at positions adjacent to the control rod 30. This configuration prevents reduction in the absorption rate that the control rod 30 absorbs thermal neutrons, which are likely to contribute to nuclear fission reaction, whereby a core can be designed without involving a reduction in reactivity worth of the control rod 30.

Further, as illustrated in FIGS. 2 and 3, preferably, in the fuel assembly 10, the burnable poison-containing fuel rods 12 are not disposed adjacent to the nuclear instrumentation device 31. With this configuration, a core can be designed without involving a reduction in accuracy of the nuclear instrumentation device 31.

Further, as illustrated in FIGS. 2 and 3, in the fuel assembly 10, at least one burnable poison-containing fuel rod 12 may not be adjacent, on at least its one surface of the four surfaces corresponding to four directions along which the square-grid shaped fuel rods are arranged, to the other fuel rods 11 or 12. That is, at least one burnable poison-containing fuel rod 12 is disposed adjacent to, e.g., the water rod 14 or the channel box 13 at the outermost peripheral portion of the assembly. With this configuration, thermal neutrons by which the burnable poison is likely to undergo absorption response often collide with the burnable poison, thereby increasing the rate of the neutrons absorbed by the burnable poison. This increases the reactivity worth of the burnable poison to thereby significantly suppress the excess reactivity.

Further, as illustrated in FIGS. 2 and 3, in the fuel assembly 10, at least some burnable poison-containing fuel rods 12 may be disposed adjacent to each other. By adjacently disposing the burnable poison-containing fuel rods 12, the number of collisions of the burnable poison on adjacent surfaces with thermal neutrons is reduced. This decreases the burning speed of the burnable poison, with the result that the reactivity of the burnable poison continues longer than in a case where the burnable poison-containing fuel rods 12 are not disposed adjacent to each other.

Figure 5:
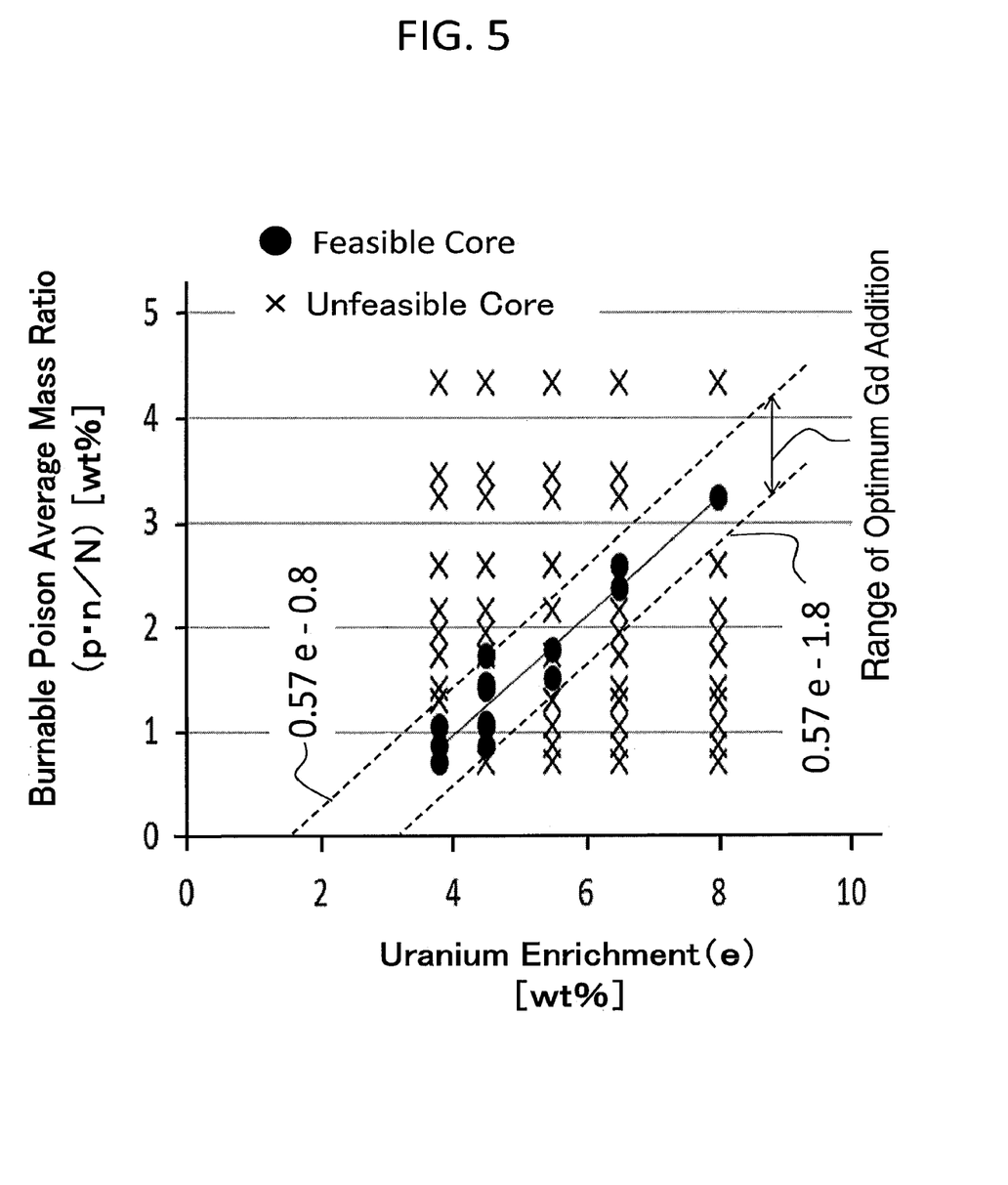
FIG. 5 is an example of a graph illustrating results on feasibility of the core which is determined for various combinations of a burnable poison average mass ratio and a uranium enrichment in the BWR fuel assembly according to the embodiment of the present invention by applying analysis calculation thereto.

FIG. 5 is an example of a graph illustrating results of feasibility of the core which is determined for various combinations of burnable poison average mass ratio and uranium enrichment in the BWR fuel assembly according to the embodiment of the present invention by applying analysis calculation thereto. The burnable poison average mass ratio is represented by (burnable poison concentration p)·(burnable poison-containing fuel rod number ratio). The burnable poison-containing fuel rod number ratio is represented by (the number n of burnable poison-containing fuel rods/total number N of the fuel rods included in the fuel assembly). Accordingly, the burnable poison average mass ratio is represented by (p·n/N). The criterion for the feasibility of the core is whether the fuel excess reactivity can be controlled by a reactivity control device such as a control rod, which may make it hard to control the reactivity or not. The fuel is feasible when its excess reactivity is less than, or equal to the reactivity which the control rods can control. The fuel is not feasible when its excess reactivity is more than the reactivity which the control rods can control.

In the nuclear characteristics evaluation analysis of FIG. 5, the same configuration as that of the fuel assembly illustrated in FIGS. 2 and 3 is assumed. By assuming that an infinite number of fuel assemblies are arranged in a grid in horizontal directions, feasibility of the core can be determined. The burnable poison is assumed to be gadolinium.

In the nuclear characteristics evaluation analysis of FIG. 5, the fuel rods in the fuel assembly are arranged in a 9 by 9 grid. However, nuclear characteristics (neutron spectrum) of the fuel assembly have a large influence on core characteristics, so that substantially the same results as those of FIG. 5 are obtained irrespective of the number of the fuel rods in the fuel assembly if a hydrogen-uranium ratio of the fuel assembly is the same. For example, even when the fuel rods in the fuel assembly are arranged in a 10 by 10 grid or an 11 by 11 grid, substantially the same results as those of FIG. 5 are obtained.

In the example of FIG. 2, the number n of burnable poison-containing fuel rods 12 is 24, and the total number N of the fuel rods included in the fuel assembly is 74; and in the example of FIG. 3, the number n is 36, and the number N is 74.

The uranium enrichment is assumed to be "e". In this case, whether the core is feasible or not was determined for various combinations of the burnable poison average mass ratio (p·n/N) and uranium enrichment e by performing analysis. As a result, two straight lines were obtained as the boundary condition determining whether the core is feasible or not as illustrated in FIG. 5. That is, a range where the burnable poison average mass ratio (p·n/N) is larger than (0.57 e−1.8) and smaller than (0.57 e−−0.8) is the optimum ratio of burnable poison addition. That is, a criterion formula (1) indicating a requirement for making the core feasible in this case is represented by the following expression:

$$0.57e-1.8 < (p \cdot n/N) < 0.57e-0.8 \qquad (1)$$

Thus, actual design of the fuel assembly can be made using the criterion formula (1).

In order to design various types of fuel assemblies different in conditions, whether the core is feasible or not is determined for a sufficient number of various combinations of burnable poison average mass ratio (p·n/N) and uranium enrichment e by performing analysis or experiment meeting the individual conditions, whereby data (results) according to the individual conditions are accumulated, and thus the graph as illustrated in FIG. 5 can be obtained. Based on the obtained graph, criterion formulas corresponding to the criterion formula (1) in individual conditions can be obtained.

The following criterion formula (2) is considered to be more appropriate in general.

$$a1 \cdot e - b < (p \cdot n/N) < a2 \cdot e - c \qquad (2)$$

In the above expression, a1, a2, b, and c are each a positive constant, and a1≥a2.

Although the above criterion formulas (1) and (2) are linear expressions, they may be quadratic expressions or other type of expressions.

Figure 6:
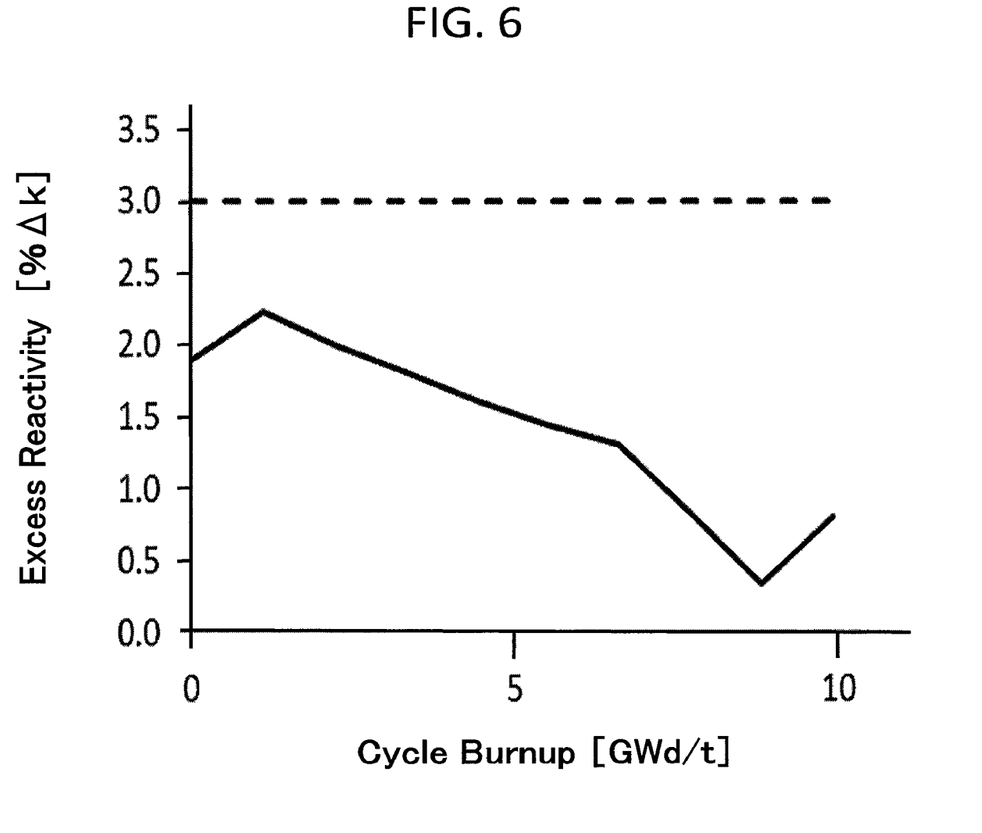
FIG. 6 is a graph illustrating an example of an analysis result on the relationship between a cycle burnup and excess reactivity when the fuel assembly falling within the optimum range of the burnable poison average mass ratio of FIG. 5 is burned in a BWR.
Figure 7:
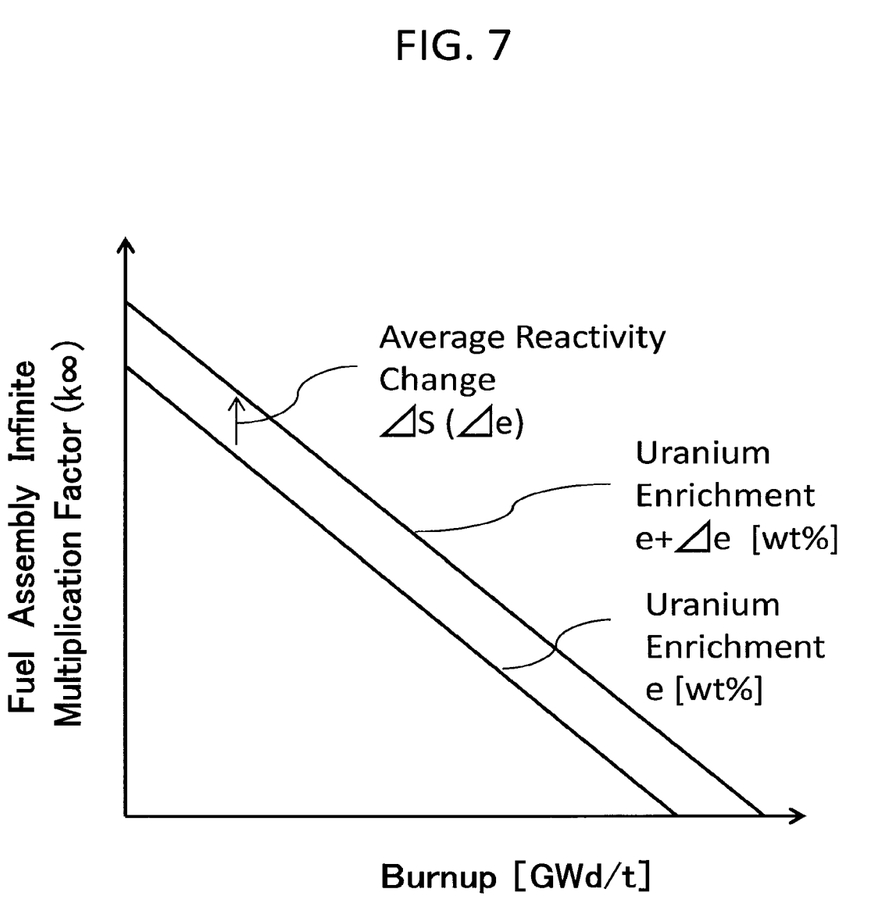
FIG. 7 is a graph schematically illustrating a change in a fuel assembly infinite multiplication factor when the uranium enrichment is increased in a design of the fuel assembly according to the embodiment of the present invention.
Figure 8:
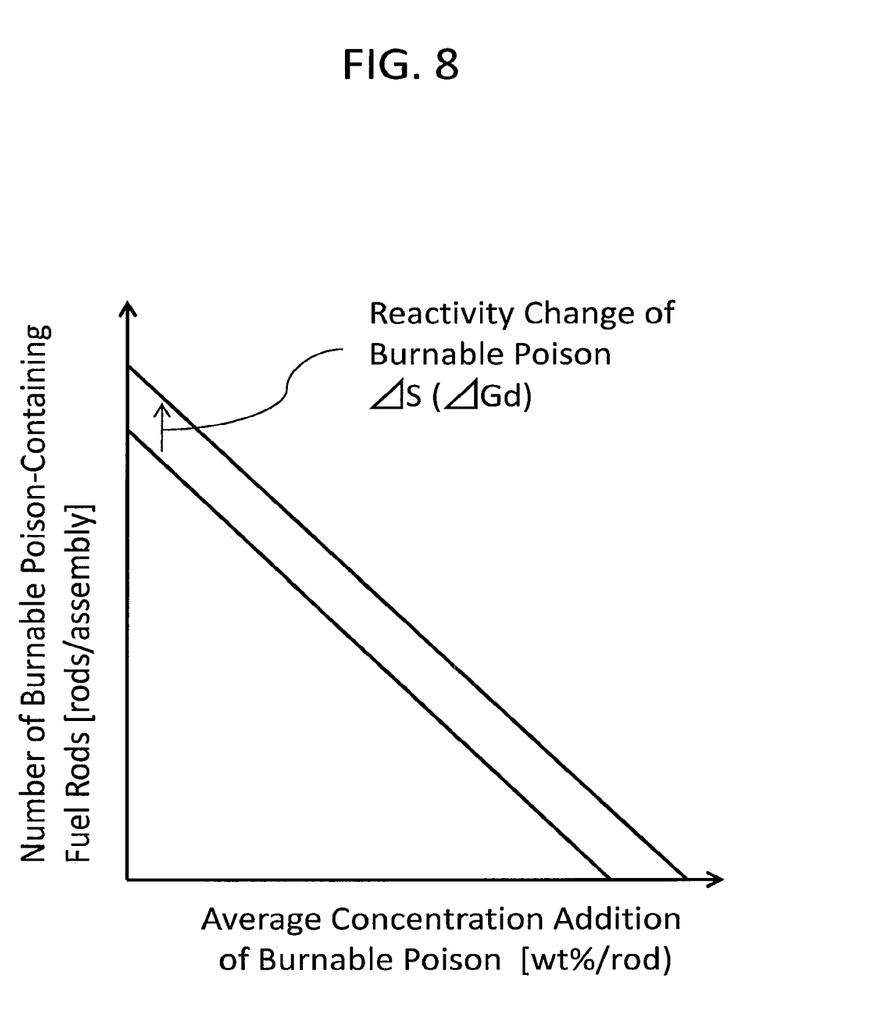
FIG. 8 is a graph schematically illustrating a change in the number of burnable poison-containing fuel rods corresponding to a change in the reactivity of the burnable poison in the design of the fuel assembly according to the embodiment of the present invention.

FIG. 6 is a graph illustrating an example of an analysis result on the relationship between a cycle burnup and excess reactivity when the fuel assembly falling within the optimum range of the burnable poison average mass ratio of FIG. 5 is burned in a BWR. FIG. 7 is a graph schematically illustrating a change in a fuel assembly infinite multiplication factor when the uranium enrichment is increased in a design of the fuel assembly according to the embodiment of the present invention. FIG. 8 is a graph schematically illustrating a change in the number of burnable poison-containing fuel rods corresponding to a change in the reactivity of the burnable poison in the design of the fuel assembly according to the embodiment of the present invention. Although a straight line is shown in FIGS. 7 and 8 each, these graphs are schematic, and the change may not be represented by straight lines.

Figure 10:
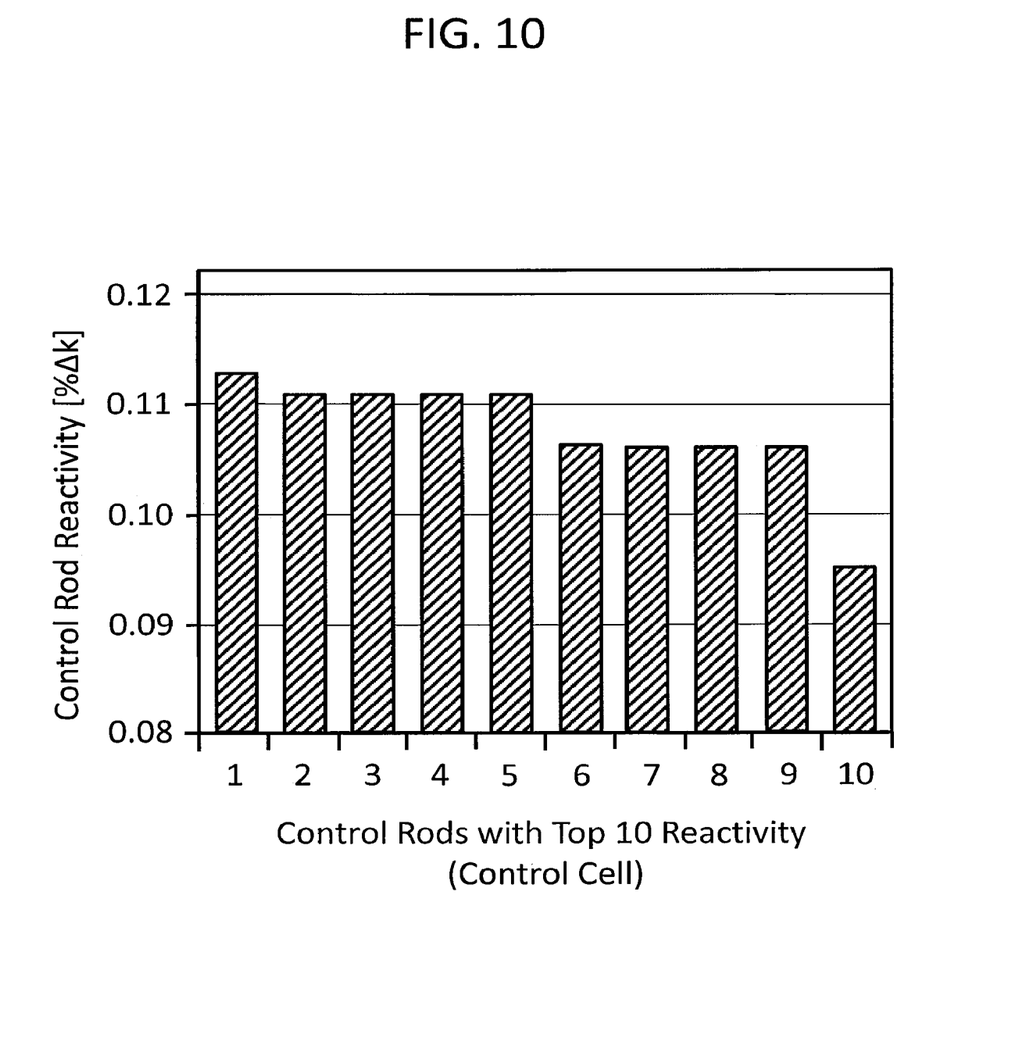
FIG. 10 is a graph illustrating values of top ten control rods in terms of the reactivity worth in a control cell core of a typical conventional BWR.

FIG. 10 is a graph illustrating values of top ten control rods in terms of the reactivity worth in a control cell core of a typical conventional BWR. As illustrated in FIG. 10, the control rod reactivity worth of the control cell is somewhat above 0.1% Δk at a maximum. In an advanced boiling water reactor (ABWR), up to 29 control cells are provided, so that the excess reactivity that can be controlled by the control cell is 3% Δk or less.

By designing a combination of the burnable poison average mass ratio (p·n/N) and uranium enrichment e of the fuel assembly 10 so as to satisfy the criterion formula (1) or (2), the excess reactivity during a nuclear reactor operation cycle can be designed to be 0 to 3.0% Δk which is a range achievable under the control of the control rod, as illustrated in FIG. 6. This is because a reactivity variation (ΔS(Δe)) when the uranium enrichment e of FIG. 7 is changed to (e+Δe) coincides with a reactivity variation (ΔS(ΔGd)) of FIG. 8 as an absorbing material changed with respect to the number n of burnable poison-containing fuel rods in the fuel assembly and the average added mass ratio. That is, by changing the total amount of the burnable poison by ΔGd, the change Δe of the uranium enrichment e can be compensated.

Figure 9:
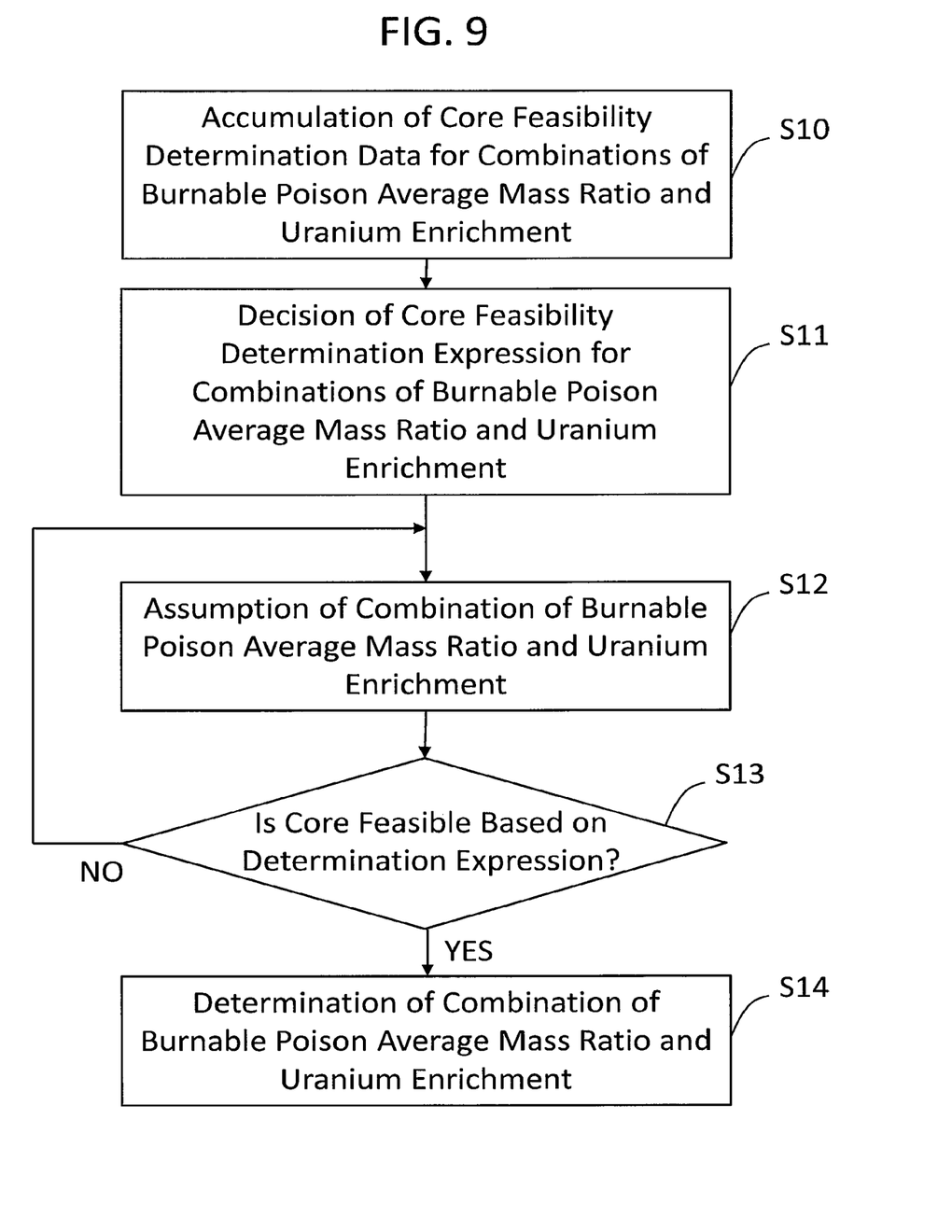
FIG. 9 is a flowchart illustrating a procedure of the fuel assembly design method according to the embodiment of the present invention.

Next, a method of designing a light-water reactor fuel assembly using the above-described investigation results will be described referring to FIG. 9. FIG. 9 is a flowchart illustrating a procedure of the fuel assembly design method according to the embodiment of the present invention.

First, the configuration of the light-water reactor fuel assembly is assumed within a predetermined range, and feasibility of the core is determined for various combinations of burnable poison average mass ratio (p·n/N) and uranium enrichment e by performing analysis calculation or experiment, whereby core feasibility determination data are accumulated as illustrated in FIG. 5 (step S10).

Then, like the above criterion formula (1) or (2), a core feasibility criterion formula is decided for various combinations of burnable poison average mass ratio (p·n/N) and uranium enrichment e based on the core feasibility determination data obtained in step S10 (step S11).

Then, a specific combination of a burnable poison average mass ratio (p·n/N) and a uranium enrichment e of the light-water reactor fuel assembly is assumed (step S12), and the feasibility of the core is determined for the assumed combination based on the core feasibility criterion formula obtained in step S11 (step S13).

When the determination result in step S13 is "NO" (unfeasible), the combination of the burnable poison average mass ratio (p·n/N) and the uranium enrichment e is changed, and steps S12 and S13 are executed again. On the other hand, when the determination result in step S13 is "YES" (feasible), design of the fuel assembly is determined by the combination of the burnable poison average mass ratio (p·n/N) and the uranium enrichment e at that time (step S14).

According to the above-described design method, the excess reactivity when uranium enrichment is increased in a light-water reactor can be reduced. Further, by deciding the core feasibility criterion formula in advance, the feasibility of the core can be easily checked when various parameters are changed in specific design of the fuel assembly, making it possible to speed up design work while saving manpower.

In the embodiment, the burnable poison to be added to nuclear fuel material is preferably a compound containing gadolinium, a compound containing erbium, or a compound containing boron.

When the burnable poison to be added to nuclear fuel material is gadolinia, the maximum mass ratio thereof is preferably lower than 20 mass %. This is because when the maximum mass ratio of gadolinia is equal to or higher than 20 mass %, a mixture of gadolinia and uranium oxide is less likely to form a solid solution.

As the burnable poison in the embodiment, gadolinium obtained by concentrating gadolinium with odd mass number (e.g., 155 or 157) is preferably used. This increases the absorption cross-sectional area of gadolinium, making it possible to reduce the additive amount of the burnable poison.

Further, by installing the fuel assembly in the light-water reactor core including the control cell, a reactivity change range due to operation of the control rod can be reduced, making it possible to easily satisfy thermal soundness of the fuel assembly in the light-water reactor core.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A design method for a fuel assembly of a light-water reactor, which includes a plurality of fuel rods arranged in parallel separated by a distance in a direction perpendicular to a longitudinal axis of the fuel rods, each of the fuel rods including a fuel clad and a fuel in the fuel clad, the fuel containing material based on uranium dioxide containing enriched uranium 235, some of the fuel rods including a burnable poison in the fuel, the design method comprising:
   accumulating core feasibility determination data investigated by analyses or experiments, showing whether or not each one of a burnable poison average mass ratio and an average enrichment of the uranium 235 contained in all of the fuel rods in the fuel assembly is within an acceptable range for a core of the fuel assembly;
   formulating a criterion formula which determines whether the burnable poison average mass ratio and the enrichment value are within acceptable ranges for the core based on the core feasibility determination data;
   setting a tentative composition of the fuel assembly;
   determining whether or not the tentative composition of the fuel assembly is acceptable for the core based on the criterion formula, wherein the average enrichment is greater than or equal to 5%; and
   designing the fuel assembly of the light-water reactor based on the tentative composition of the fuel assembly determined to be acceptable for the core.

2. The design method for the fuel assembly of the light-water reactor according to claim 1, wherein the criterion formula is $(a1 \cdot e) - b < p \cdot n/N < (a2 \cdot e) - c$, wherein N is an integer equal to or greater than 2 and N is a number of the fuel rods in the fuel assembly, n is a number of the fuel rods containing the burnable poison and an integer equal to or greater than 1 and less than N, p is a ratio wt % of the burnable poison in the fuel, and e is the average enrichment wt % of the uranium 235 contained in all of the fuel rods in the fuel assembly, each of a1, a2, b and c is a positive constant and a1 is equal to or greater than a2.

3. The design method for the fuel assembly of the light-water reactor according to claim 1, wherein the criterion formula is $(a1 \cdot e) - b < p \cdot n/N < (a2 \cdot e) - c$, wherein N is an integer equal to or greater than 2 and N is a number of the fuel rods in the fuel assembly, n is a number of the fuel rods containing the burnable poison and an integer equal to or greater than 1 and less than N, p is a ratio wt % of the burnable poison in the fuel, and e is the average enrichment wt % of the uranium 235 contained in all of the fuel rods in the fuel assembly, each of a1, a2, b and c is a positive constant and a1 is equal to or greater than a2.

4. The design method for the fuel assembly of the light-water reactor according to claim 3, wherein each of a1 and a2 is 0.57, b is 1.8, and c is 0.8.

5. The design method for the fuel assembly of the light-water reactor according to claim 1, wherein the average enrichment of the enriched uranium 235 in the fuel containing the burnable poison is less than the maximum enrichment of the enriched uranium 235 in the fuel in the fuel assembly.

6. The design method for the fuel assembly of the light-water reactor according to claim 1, wherein the fuel rods are arranged into a square lattice array and at least one of the fuel rods containing the burnable poison does not face other fuel rods.

7. The design method for the fuel assembly of the light-water reactor according to claim 1, wherein the fuel rods are arranged into a square lattice array and at least one of the fuel rods containing the burnable poison does face other fuel rods containing the burnable poison with at least one side of the four sides of the fuel rods arranged into the square lattice array.

8. The design method for the fuel assembly of the light-water reactor according to claim 1, wherein the burnable poison contains compounds containing gadolinium, erbium, or boron.

9. The design method for the fuel assembly of the light-water reactor according to claim 1, wherein the burnable poison is gadolinia and maximum concentration of the gadolinia in the fuel is less than 20 wt %.

10. The design method for the fuel assembly of the light-water reactor according to claim 1,
   wherein the burnable poison is gadolinia wherein gadolinia of odd mass is more concentrated than gadolinia of even mass.

* * * * *